Figure 5:
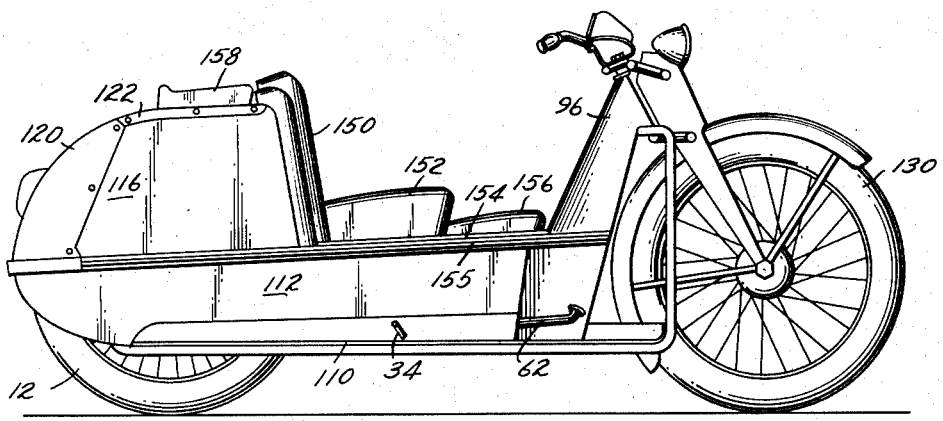

May 12, 1953 A. I. POULSEN 2,638,175
STARTER BRAKE FOR POWER CYCLES
Filed Aug. 30, 1950 2 Sheets-Sheet 1
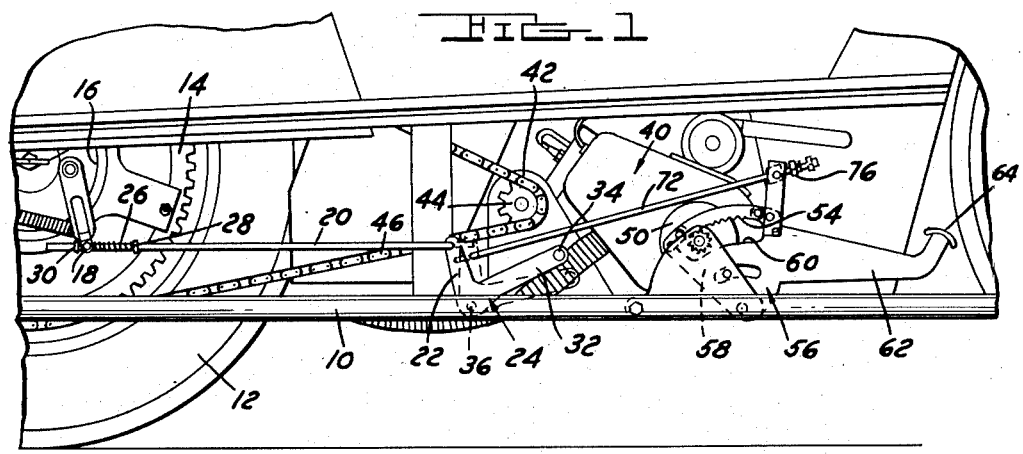
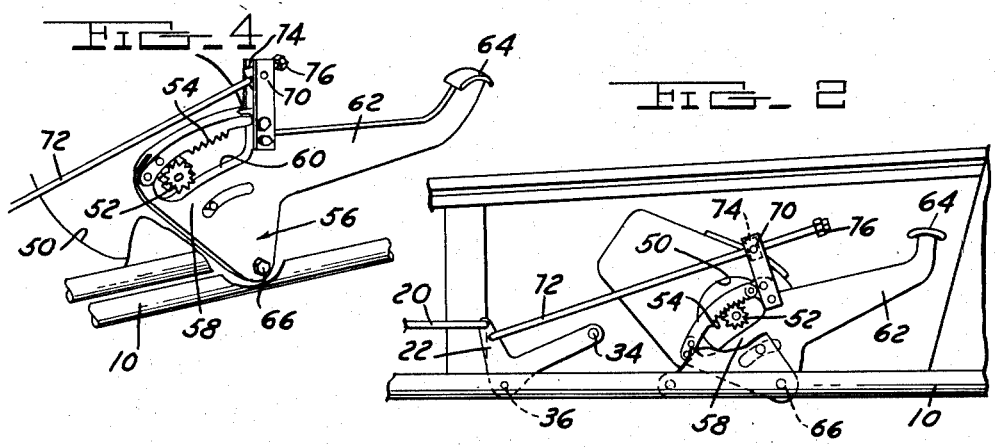
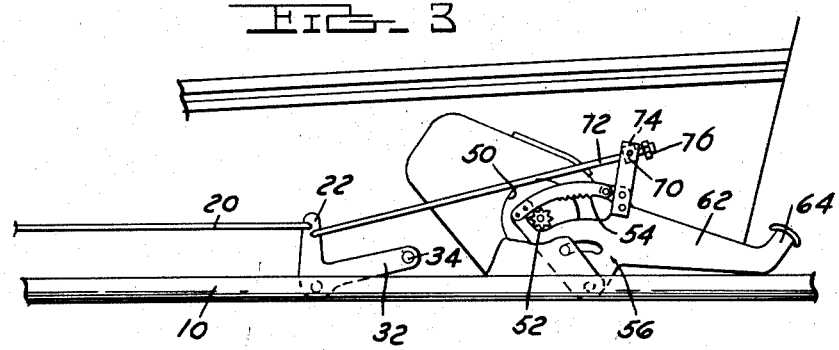
INVENTOR.
AXEL I. POULSEN
BY
Barney, Kisselle, Laughlin & Raisch
ATTORNEYS May 12, 1953          A. I. POULSEN          2,638,175
STARTER BRAKE FOR POWER CYCLES Filed Aug. 30, 1950          2 Sheets-Sheet 2

Inventor
AXEL I. POULSEN

BY Barnes, Kiesell, Laughlin & Raisch
Attorneys

Patented May 12, 1953

2,638,175

UNITED STATES PATENT OFFICE 2,638,175

STARTER BRAKE FOR POWER CYCLES

Axel I. Poulsen, Detroit, Mich., assignor to Fred H. Johnson

Application August 30, 1950, Serial No. 182,314

4 Claims. (Cl. 180—33)

This invention relates to a power cycle and has particularly to do with a combination starter brake assembly for use in such cycles.

The cycle under consideration is of the type intended to seat a plurality of passengers in fore and aft positions, and it is the purpose of the present invention to provide a braking system which may be actuated at a plurality of points along the cycle and also to provide a combination starter lever which serves also as a brake.

Drawings accompany the specification, and the various views thereof may be briefly described as:

Figure 1, an assembly view showing a portion of the power cycle together with the brake operating system.

Figure 2, a view showing the combination starter and brake lever in starting position.

Figure 3, a view showing the brake lever in braking position.

Figure 4, a view showing the combination starter brake lever in idling position.

Figure 5, a view showing a completed assembly of a power cycle with seating arrangements for a plurality of passengers.

Referring to the drawings, the frame of the power cycle is shown having a longitudinally extending member 10. A rear wheel 12 has an actuating gear 14, a brake drum 16, and a brake actuating arm 18. A link 20 is resiliently pivoted to the arm 18 and extends forward to an end 22 of a bell-crank lever 24.

A spring 26 on link 20 bears against the stop 28 and against the arm 18 so that link 20 may be backed off with respect to the arm. However, a stop 30 will actuate the arm 18 when link 20 is placed in tension. The other end 32 of the bell-crank lever 24 is an actuating end having a projecting stud 34 which may serve to receive foot pressure. Actuation of the brake arm 18 is accomplished by merely applying foot pressure downward on the stud 34, the bell-crank 24 being pivoted at 36 on frame member 10.

An engine 40 is mounted on the frame of the power cycle and suitably connected in a manner not shown to a transmission 42 which drives a gear 44 connected by a chain 46 to the drive sprocket 14. A starter mechanism housed in a circular shell 50 serves to start the motor 40, and a pinion 52 is the actuating means for the starter mechanism, details of which are not shown but are commonly known in practice.

The pinion 52 is to be actuated by a gear rack 54 which is formed on a bell-crank type of lever 56 which has a wedged shaped end 58 provided with an arcuate opening 60, one side of which is formed as the gear rack 54. The pinion lies within this opening 60, and it will be noticed that the gear rack 54 extends only through a portion of the opening 60 so that in the position shown in Figures 1, 3 and 4 the pinion is free to idle within this opening.

A lever or pedal end of the bell-crank 56 extends forwardly at 62 and has a foot plate 64 which extends to the side of the lever and permits it to be raised to a starting position as shown in Figure 2. When so raised, the pinion, which has a free wheeling motion in a counter-clockwise direction, will engage the rack 54 and upon a sudden downward thrust of lever end 62 a starting motion will be imparted to the pinion, the bell-crank lever being pivoted at 66 on frame member 10.

Projecting upwardly from the lever 56 is a brake actuating arm 70 which straddles a link 72 connected at its rearward end to lever end 22. A slide block 74 slides on the rod 72 and is pivotally associated with the yoke 70. A stop 76 limits the forward motion of block 74 on link rod 72.

With the above described construction, the arm 62 of the forward bell-crank may also actuate the brake through the arm 22 and the link rod 20. When the starter mechanism is being operated, the arm 70 will slip back on the rod 72 and it will be out of action. There is a lost-motion connection here which operates only when the block 74 reaches the stop 76. With the parts in the position shown in Figure 4, a further depression of lever 64 will actuate brake rod 72 as shown in Figure 3. To re-start the engine, it is necessary to retract lever 62 to the position shown in Figure 2 before pressing down to actuate pinion 52.

It will thus be seen that the brake arm 18 may be actuated by an operator either sitting to the rear using lever 32 or an operator sitting forward of the machine using lever 62. Also, when the machine is operating, the pinion 52 is free to rotate, thus preventing unusual wear on the clutch relation between the pinion and the starter mechanism.

In Figure 5, an assembly of a vehicle in which the starting and brake mechanism would be used is shown. Surrounding and to the rear of the front yoke of the vehicle is a shield plate 96, and on the sides of the vehicle are foot rests 110 positioned on a horizontal plane and terminating inwardly at vertical side plates 112. The rear housing of the unit is formed by plates 116 together with a rear housing member 120 and a top closure member 122. A front dirigible wheel 130 and a rear power wheel 12 support the vehicle, and the starter lever above referred to is shown at 62. The supplemental brake lever is shown at 34. The seat back 150 serves as the main seat for a single occupant together with the seat portion 152 supported on horizontal frame members 154. In front of the seat 152 is a supplemental seat 156, and behind the seat 150 is a supplemental seat 158.

What I claim is:

1. In a two-wheeled vehicle comprising a frame and means thereon to support two passengers in fore and aft positions, an engine in said frame, a brake mechanism on one of said wheels, a brake actuating arm, a first pedal on said vehicle connected to said arm to actuate the same in response to foot pressure, a second pedal on said vehicle connected to said arm by a lost-motion device, a starter mechanism actuated by a pinion gear, and a rack connected to said second pedal to engage and actuate said pinion in a portion of the stroke of said pedal, the remainder of the stroke serving to actuate said brake arm.

2. In a two-wheeled vehicle comprising a frame and means thereon to support two passengers in fore and aft positions, an engine in said frame, a brake mechanism on one of said wheels, a brake actuating arm, a first pedal lever on said vehicle connected to said arm to actuate the same in response to foot pressure, said first pedal comprising a bell-crank lever having a first end linked to said arm and the second end serving as a pedal, a second pedal lever on said vehicle spaced longitudinally of the vehicle comprising a bell-crank lever having a first end linked to the first end of the first pedal lever with a lost motion connection, and a second end to act as a pedal, a portion of the first end being shaped as a gear rack, a starting mechanism, a pinion to actuate said starting mechanism positioned to engage said rack in a portion of its travel whereby in one portion of the stroke of said second lever said pinion is actuated, and in the remainder of the stroke said brake mechanism is actuated.

3. A device as defined in claim 2 in which the rack is disengaged from the pinion in the portion of the stroke of the second pedal lever in which the brake is actuated.

4. In a two-wheeled vehicle comprising a frame and means thereon to support a plurality of passengers in fore and aft positions, an engine on said frame, a brake mechanism associated with one of the wheels of said vehicle, means to actuate said brake mechanism, rear and forward actuating pedals spaced from each other and pivoted for an operating stroke on said frame to various positions, means operably connecting one of said pedals to said brake actuating mechanism, a starter mechanism associated with said engine, means operably associating the other of said pedals to said brake actuating mechanism in a lost motion connection to actuate said mechanism at the end of its stroke, and means operably associating said other pedal with said starter mechanism to actuate the starter mechanism in the first portion of the stroke of said pedal.

AXEL I. POULSEN.

References Cited in the file of this patent
UNITED STATES PATENTS

| Number | Name | Date |
|---|---|---|
| 1,235,747 | Whitehall | Aug. 7, 1917 |
| 1,297,676 | Gibson | Mar. 18, 1919 |

FOREIGN PATENTS

| Number | Country | Date |
|---|---|---|
| 11,934 | Great Britain | of 1912 |